United States Patent
Sasaoka et al.

(10) Patent No.: US 6,567,597 B2
(45) Date of Patent: May 20, 2003

(54) OPTICAL FIBER, METHOD OF MAKING THE SAME, AND OPTICAL TRANSMISSION SYSTEM INCLUDING THE SAME

(75) Inventors: Eisuke Sasaoka, Yokohama (JP); Masashi Onishi, Yokohama (JP); Katsuya Nagayama, Yokohama (JP); Kaoru Okuno, Yokohama (JP); Kazuya Kuwahara, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 09/899,020

(22) Filed: Jul. 6, 2001

(65) Prior Publication Data

US 2001/0046358 A1 Nov. 29, 2001

Related U.S. Application Data

(63) Continuation-in-part of application No. PCT/JP00/07844, filed on Nov. 8, 2000.

(30) Foreign Application Priority Data

Nov. 8, 1999 (JP) .......................................... 11-317022

(51) Int. Cl.⁷ ................................................. G02B 6/02
(52) U.S. Cl. ....................................................... 385/123
(58) Field of Search ................................. 385/123, 122, 385/126, 127, 147

(56) References Cited

U.S. PATENT DOCUMENTS 5,894,537 A    4/1999  Berkey et al. ............... 385/123

FOREIGN PATENT DOCUMENTS

| EP | 0582405 | 2/1994 |
|---|---|---|
| EP | 0729919 | 9/1996 |
| EP | 0744636 | 11/1996 |
| EP | 0795521 | 9/1997 |
| JP | 57-158806 | 9/1982 |
| JP | 08-295528 | 11/1996 |
| WO | WO 97/06456 | 2/1997 |
| WO | WO 97/06457 | 2/1997 |

OTHER PUBLICATIONS

Yoshiaki Terasawa, Yoshiyuki Suetsugu, Takatoshi Kato, and Masayuki Nishimura, "Design Optimization Of Dispersion Shifted Fiber With Enlarged Mode Field Diameter for WDM Transmission," Sumitomo Electric Industries, Ltd., Tenth International Conference On Integrated Optics and Optical Fibre Communication, Technical Digest, vol. 4, Jun. 30, 1995, pp. 11–13.

*Primary Examiner*—Tulsidas Patel
(74) *Attorney, Agent, or Firm*—McDermott, Will & Emery (57) ABSTRACT

The present invention provides an optical fiber and the like comprising a structure making it possible to realize optical communications with a higher speed and a larger capacity as compared with conventional optical transmission systems. The optical fiber according to the present invention is an optical fiber in which at least one first portion having a positive chromatic dispersion at a predetermined wavelength within a wavelength band in use and at least one second portion having a negative chromatic dispersion at the predetermined wavelength are arranged adjacent each other along the longitudinal direction thereof. In particular, the optical fiber comprises a polarization coupling structure for inducing coupling between polarization modes of propagating light. This polarization coupling structure randomly causes coupling between polarization modes of the propagating light, whereby polarization mode dispersion decreases at the predetermined wavelength. As a consequence, transmission characteristics are effectively restrained from deteriorating due to polarization mode dispersion. Specifically, the polarization coupling structure is a twist applied to the optical fiber.

29 Claims, 9 Drawing Sheets

TO GUIDE ROLLER 231

OPTICAL FIBER, METHOD OF MAKING THE SAME, AND OPTICAL TRANSMISSION SYSTEM INCLUDING THE SAME

RELATED APPLICATIONS

This Application is a continuation in part of International Application No. PCT/JP00/07844, whose international filing date is Nov. 8, 2000. which in turn, claims the benefit of Japanese Patent Application No. P1999-317022. filed Nov. 8, 1999. the disclosures of which Applications are incorporated by reference herein. The benefit of the filing and priority dates of the International and the Japanese Applications is respectfully requested

BACKGROUND OF THE INVENTION

1. Field of the Invention

The present invention relates to an optical fiber suitable for transmitting signals of a plurality of channels in wavelength division multiplexing (WDM) transmission, a method of making the same, and an optical transmission system including the same.

2. Related Background Art

WDM transmission enables high-speed, large-capacity optical communications by transmitting signals of a plurality of channels (hereinafter referred to as WDM signals). Silica type optical fibers are employed as an optical transmission line for WDM transmission since their transmission loss is low in the vicinity of a wavelength of 1.55 $\mu$m, whereas WDM signals in the wavelength band of 1.55 $\mu$m are utilized since optical amplifiers enabling signal amplification in the 1.55-$\mu$m wavelength band have been put into practice.

If chromatic dispersion occurs in a signal wavelength region (e.g., 1.55-$\mu$m wavelength band), then the pulse waveform of each WDM signal deforms, whereby transmission characteristics deteriorate. Therefore, from the viewpoint of preventing the signal waveform from deteriorating, the chromatic dispersion in optical transmission lines for transmitting WDM signals is desired to be low in the signal wavelength region. If the chromatic dispersion in the signal wavelength region is substantially zero, on the other hand, then four-wave mixing, which is a kind of nonlinear optical phenomena, is likely to occur, thereby causing crosstalk and noise, by which transmission characteristics deteriorate. For suppressing the occurrence of four-wave mixing, the repeating interval may be shortened so as to lower the signal power. However, this requires a number of optical amplifiers to be disposed in an optical transmission line, whereby thus obtained optical transmission system becomes expensive as a whole.

For example, in order to deal with the foregoing problems, U.S. Pat. No. 5,894,537 proposes a dispersion management optical fiber in which a plurality of positive and negative dispersion segments having positive and negative chromatic dispersions, respectively, at a predetermined wavelength (e.g., wavelength of 1.55 $\mu$m) are alternately disposed along the longitudinal direction. If such a dispersion management optical fiber is employed in an optical transmission line, then the average chromatic dispersion in the optical transmission line as a whole becomes substantially zero, whereby transmission characteristics are effectively restrained from deteriorating due to cumulative chromatic dispersion. Since a positive or negative chromatic dispersion occurs (the absolute value of chromatic dispersion is not near zero) in substantially all the regions of the optical transmission line, transmission characteristics are restrained from deteriorating due to four-wave mixing.

SUMMARY OF THE INVENTION

The inventors studied the prior art mentioned above and, as a result, have found a problem as follows. Namely, signal pulses may deteriorate their waveforms even in an optical transmission system in which a dispersion management optical fiber is employed in an optical transmission line as mentioned above, whereby there has been a possibility of high-speed, large-capacity optical communications failing to be realized in such a case.

In order to overcome the problem mentioned above, it is an object of the present invention to provide an optical fiber comprising a structure making it possible to realize higher-speed, larger-capacity optical communications as compared with those with conventional optical transmission systems, a method of making the same, and an optical transmission system including the same.

The optical fiber according to the present invention constitutes at least a part of any repeated transmission line between a transmitting station for sending out signals of a plurality of channels and a repeater station including an optical amplifier or the like, between repeater stations, and between a repeater station and a receiving station. Also, this optical fiber is an optical fiber mainly composed of silica glass, in which at least one first portion having a positive chromatic dispersion at a predetermined wavelength in a wavelength band in use and at least one second portion having a negative chromatic dispersion at the predetermined wavelength are arranged adjacent each other along the longitudinal direction. While the first and second portions having positive and negative chromatic dispersions, respectively, are disposed alternately in the longitudinal direction so as to effect dispersion management, the optical fiber according to the present invention further comprises a polarization coupling structure for inducing coupling between polarization modes of propagating light. This optical fiber may be either a unitary optical fiber in which the first and second portions are alternately arranged along the longitudinal direction thereof or an optical fiber in which optical fibers having positive and negative chromatic dispersions corresponding to the first and second portions, respectively, are alternately fusion-spliced.

Consequently, the optical fiber lowers each of the deterioration in signal waveform caused by nonlinear optical phenomena and the deterioration in signal waveform caused by cumulative chromatic dispersion. Also, the polarization coupling structure for inducing coupling between polarization modes of propagating light lowers the deterioration in waveform caused by polarization mode dispersion. Therefore, the optical fiber according to the present invention is excellent in transmission quality, and enables higher-speed, larger-capacity WDM transmission.

In the optical fiber according to the present invention, the polarization mode dispersion at the predetermined wavelength is preferably 0.1 ps·km$^{-\frac{1}{2}}$ or less. Also, its average coupling length, which is defined by the length from an end part of the optical fiber to a boundary at which a region where the polarization mode dispersion value is in proportion to the fiber length shifts to a region where the polarization mode dispersion value is in proportion to the square root of fiber length, is preferably 10 m or less. In each of these cases, the deterioration in waveform caused by polarization mode dispersion is sufficiently lowered.

The above-mentioned polarization coupling structure includes a twist provided to the optical fiber. In this case, thus provided twist induces random coupling between polarization modes of propagating light, thereby lowering the deterioration in waveform caused by polarization mode dispersion. In particular, the average rate of twist is preferably 2 rotations/m or more, whereas the deviation of twist rate is preferably 1 rotation/m or more. Further, a transient region disposed between each of first portion having a positive chromatic dispersion and each second portion having a negative chromatic dispersion is preferably not substantially provided with the above-mentioned twist. This is because of the fact that the controllability of drawing conditions improves in the transient region, whereby the longitudinal change of chromatic dispersion can be stabilized.

In a method of making an optical fiber comprising the characteristic structure as explained in the foregoing, an optical fiber preform is prepared at first, and a part of thus prepared optical fiber preform is drawn while being heated. In particular, a drawing condition, for example, such as the fiber diameter or the drawing tension, is changed at the time of drawing such that at least one first portion having a positive chromatic dispersion at a predetermined wavelength within the wavelength band in use and at least one second portion having a negative dispersion at the predetermined wavelength are alternately formed along the longitudinal direction. In addition, this drawing provides a predetermined portion of thus obtained optical fiber with a twist. By way of such a manufacturing process, the optical fiber comprising a characteristic structure as mentioned above is obtained.

The average rate of the above-mentioned twist is preferably 2 rotations/m or more, whereas the deviation of the twist rate is preferably 1 rotation/m or more. Preferably, the transient region positioned between the first and second portions in the optical fiber obtained by the above-mentioned making method is not substantially provided with the above-mentioned twist. This is because of the fact that the controllability of drawing conditions improves in the transient region of the resulting optical fiber, and the longitudinal change of chromatic dispersion is stabilized.

Further, the optical transmission system according to the present invention comprises, as at least a part of an optical transmission line in a repeated section, an optical fiber comprising the characteristic structure as mentioned above. This lowers the waveform deterioration caused by any of nonlinear optical phenomena, cumulative chromatic dispersion, and polarization mode dispersion, and enables higher-speed, larger-capacity WDM transmission excellent in transmission quality.

The present invention will be more fully understood from the detailed description given hereinbelow and the accompanying drawings, which are given byway of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

DETAILED DESCRIPTION OF THE PREFERRED EMBODIMENTS

In the following, an optical fiber according to the present invention, a method of making the same, and an optical transmission system including the same will be explained with reference to FIGS. 1A to 1C, 2 to 4, 5A to 5C, 6 to 8, 9A, 9B, and 10 and 11. In the explanation of the drawings, constituents identical to each other will be referred to with numerals identical to each other without repeating their overlapping descriptions.

Figure 1A:
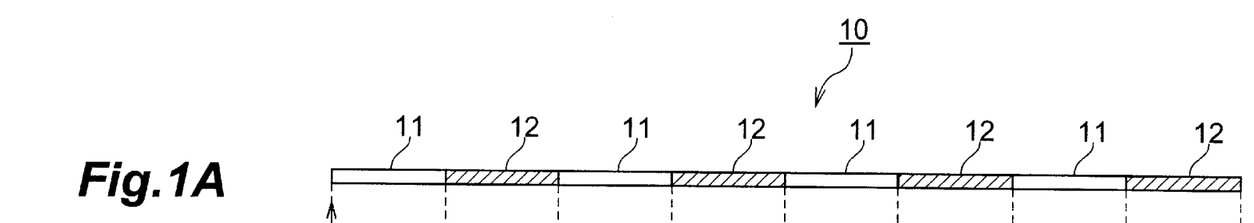
FIGS. 1A to 1C are charts for explaining the structure of an optical fiber according to the present invention.
Figure 1B:
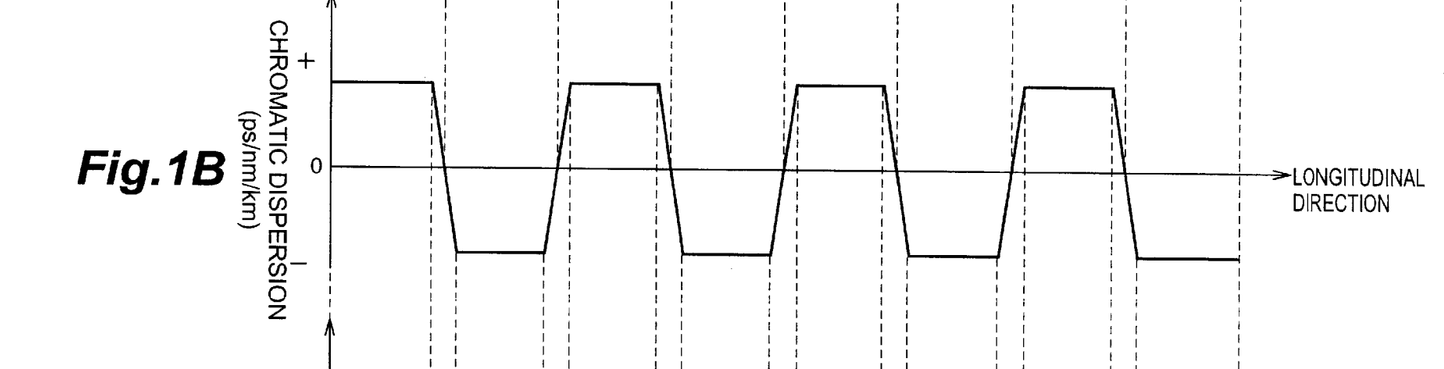
Figure 1C:
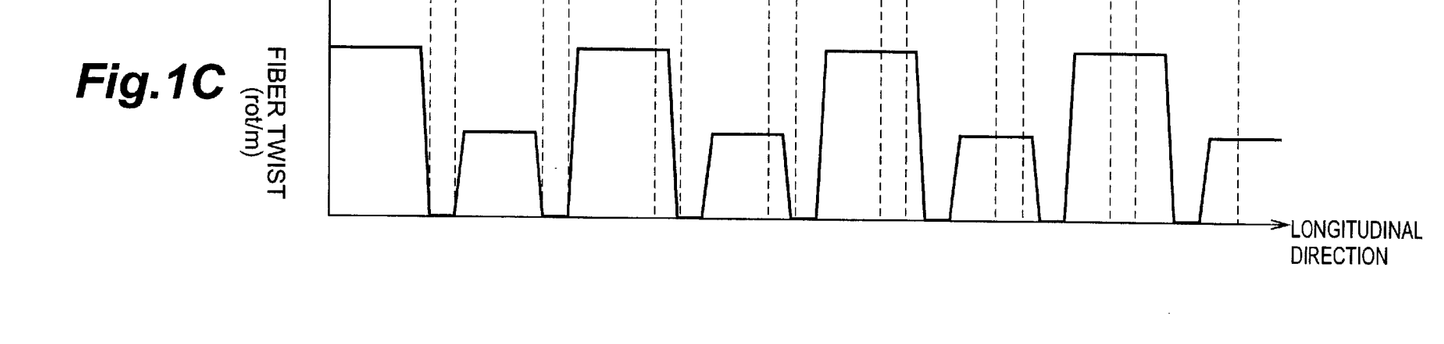

FIGS. 1A to 1C are charts showing the structure of an optical fiber according to the present invention. This optical fiber 10 is an optical fiber mainly composed of silica glass, in which at least one positive dispersion portion 11 (first portion) having a positive chromatic dispersion at a predetermined wavelength in a wavelength band in use and at least one negative dispersion portion 12 (second portion) having a negative chromatic dispersion at the predetermined wavelength are arranged adjacent each other along the longitudinal direction thereof. This optical fiber 10 may be either a unitary optical fiber in which the above-mentioned first and second portions 11, 12 are alternately arranged along the longitudinal direction thereof or an optical fiber in which optical fibers having positive and negative chromatic dispersions corresponding to the first and second portions 11, 12, respectively, are alternately fusion-spliced together. For example, the above-mentioned wavelength band in use is the 1.55-$\mu$m wavelength band (1.530 $\mu$m to 1.565 $\mu$m) utilized in WDM transmission, whereas the predetermined wavelength is a wavelength of 1.55 $\mu$m. In the optical fiber 10, a single mode is secured in the wavelength band in use.

Preferably, in the optical fiber 10, each of the positive and negative dispersion portions 11, 12 has a chromatic dispersion with an absolute value of 1 ps/nm/km or more in the wavelength band in use. This is because of the fact that it restrains transmission characteristics from deteriorating due to nonlinear optical phenomena. By contrast, it is preferable for the optical fiber 10 to have an average chromatic dispersion with an absolute value as small as possible in the wavelength band in use. This is because of the fact that it effectively restrains transmission characteristics from deteriorating due to cumulative chromatic dispersion. Here, the chromatic dispersion in each of the positive and negative dispersion portions 11, 12 in the optical fiber 10 is adjusted by the refractive index change and core diameter change according to the residual stress.

Further, the optical fiber 10 according to the present invention comprises a polarization coupling structure for inducing coupling between polarization modes of propagating light. This polarization coupling structure includes a twist provided to each of the portions 11, 12 in the optical fiber 10 as shown in FIG. 1C. Since this polarization coupling structure induces random coupling between polarization modes of propagating light, the polarization mode dispersion at the predetermined wavelength decreases, whereby transmission characteristics are effectively restrained from deteriorating due to polarization mode dispersion.

As in the foregoing, at a predetermined wavelength within the wavelength band in use, the optical fiber 10 according to the present invention locally generates a chromatic dispersion with a large absolute value whereas both the absolute value of average chromatic dispersion and the polarization mode dispersion are small as a whole. Therefore, the chromatic dispersion caused by any of the nonlinear optical phenomena, cumulative chromatic dispersion, and polarization mode dispersion is lowered, while higher-speed, larger-capacity WDM transmission with an excellent transmission quality becomes possible.

In particular, the polarization mode dispersion is preferably 0.1 ps·km$^{-1/2}$ or less, whereas the average coupling length is preferably 10 m or less. In each case, the waveform deterioration caused by polarization mode dispersion is sufficiently lowered. Here, the average coupling length is defined as follows. As the polarization mode dispersion is measured in the longitudinal direction of optical fiber 10, the polarization mode dispersion is in proportion to the fiber length when the latter is shorter, but it becomes proportional to the square root of fiber length when the fiber length is sufficiently longer. According to this phenomenon, the average coupling length is defined as the length from an end part of the optical fiber to a boundary at which a region where the polarization mode dispersion value is in proportion to the fiber length shifts to a region where the polarization mode dispersion value is in proportion to the square root of fiber length. Here, the average coupling length is empirically measured as follows.

Figure 2:
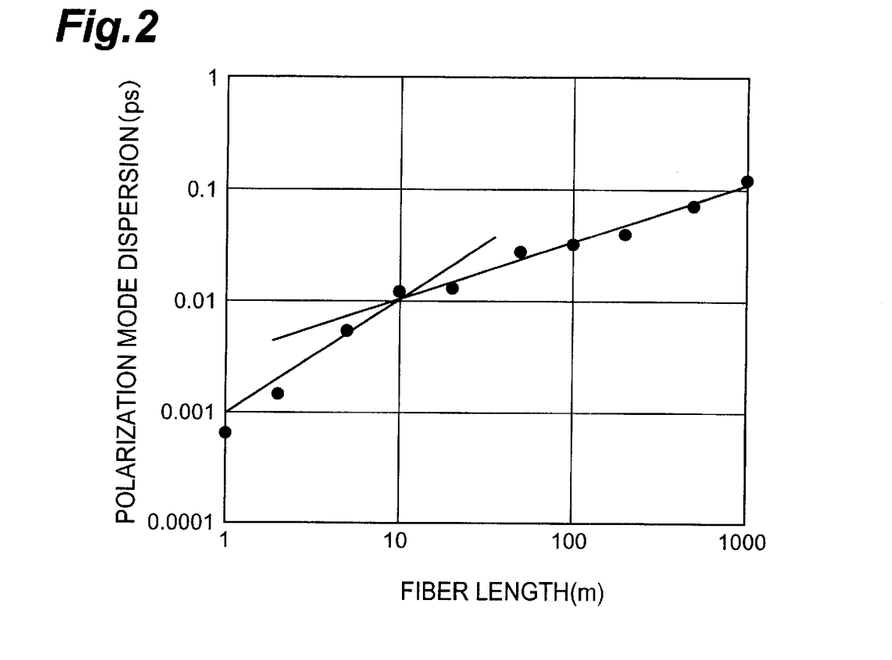
FIG. 2 is a graph for explaining a method of determining an average coupling length.

First, polarization mode dispersion is measured at a position separated by a predetermined distance from an end part of the optical fiber to be measured, and thus measured data are plotted on a logarithmic graph as shown in FIG. 2 (so as to determine the fiber length dependence of polarization mode dispersion). Then, in a region with a shorter fiber length, fitting is carried out such that the plot data of polarization mode dispersion are in proportion to the fiber length (fitting with a line having a gradient of 1 on the logarithmic graph in the case of FIG. 2). In a region with a longer fiber length, on the other hand, fitting is carried out such that the plot data of polarization mode dispersion are in proportion to the square root of fiber length (fitting with a line having a gradient of ½ on the logarithmic graph in the case of FIG. 2). The fiber length corresponding to the intersection of thus fitted two lines is defined as the average coupling length.

In an empirical method such as the one mentioned above, however, there is arbitrariness in choosing the regions with shorter and longer fiber lengths. Therefore, fitting is carried out again for each of respective regions with fiber lengths shorter and longer than the average coupling length obtained in the previous trial, so as to determine the average coupling length. As this operation is repeated, the average coupling length can be converged at a constant value.

The polarization coupling structure is specifically a twist provided to the optical fiber 10. For lowering the polarization mode dispersion by coupling between polarization modes of propagating light, the average rate of twist is preferably 2 rotations/m or more, whereas the twist rate deviation (=maximum value of twist rate—minimum value of twist rate) is 1 rotation/m or more. Preferably, however, the transient region positioned between the positive and negative dispersion portions 11, 12 of optical fiber 10 is not substantially provided with the twist. This is because of the fact that it improves the controllability of drawing conditions and stabilizes the longitudinal change of chromatic dispersion.

Figure 3:
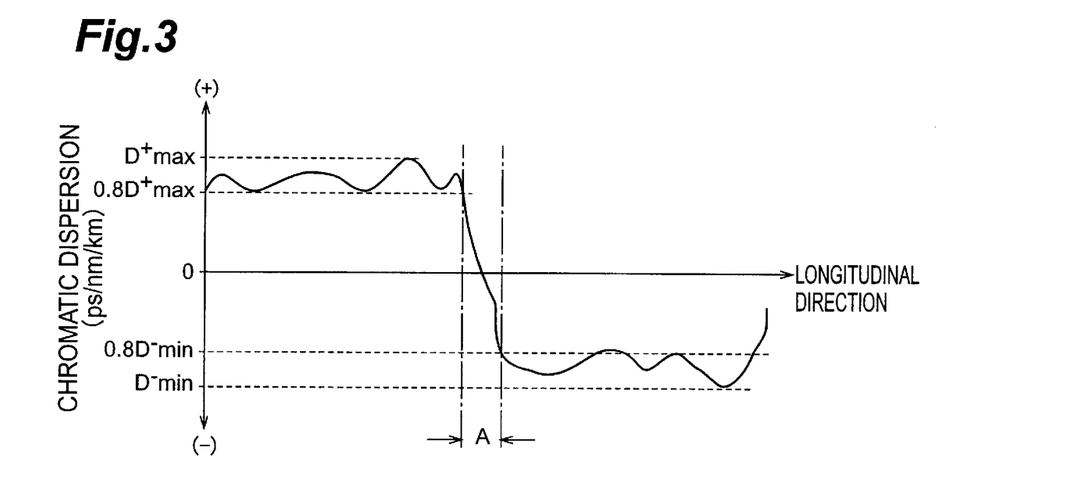
FIG. 3 is a chart for explaining a transient region.

In this specification, the transient region positioned between the positive and negative dispersion portions 11, 12 corresponds to the region A shown in FIG. 3. Namely, the region A extending from a part where the dispersion becomes 80% or less of the maximum dispersion $D^+_{max}$ in the positive dispersion portion 11 to a part where the dispersion becomes 80% or more of the minimum dispersion $D^-_{min}$ in the negative dispersion portion 12 is referred to as the transient region.

Figure 4:
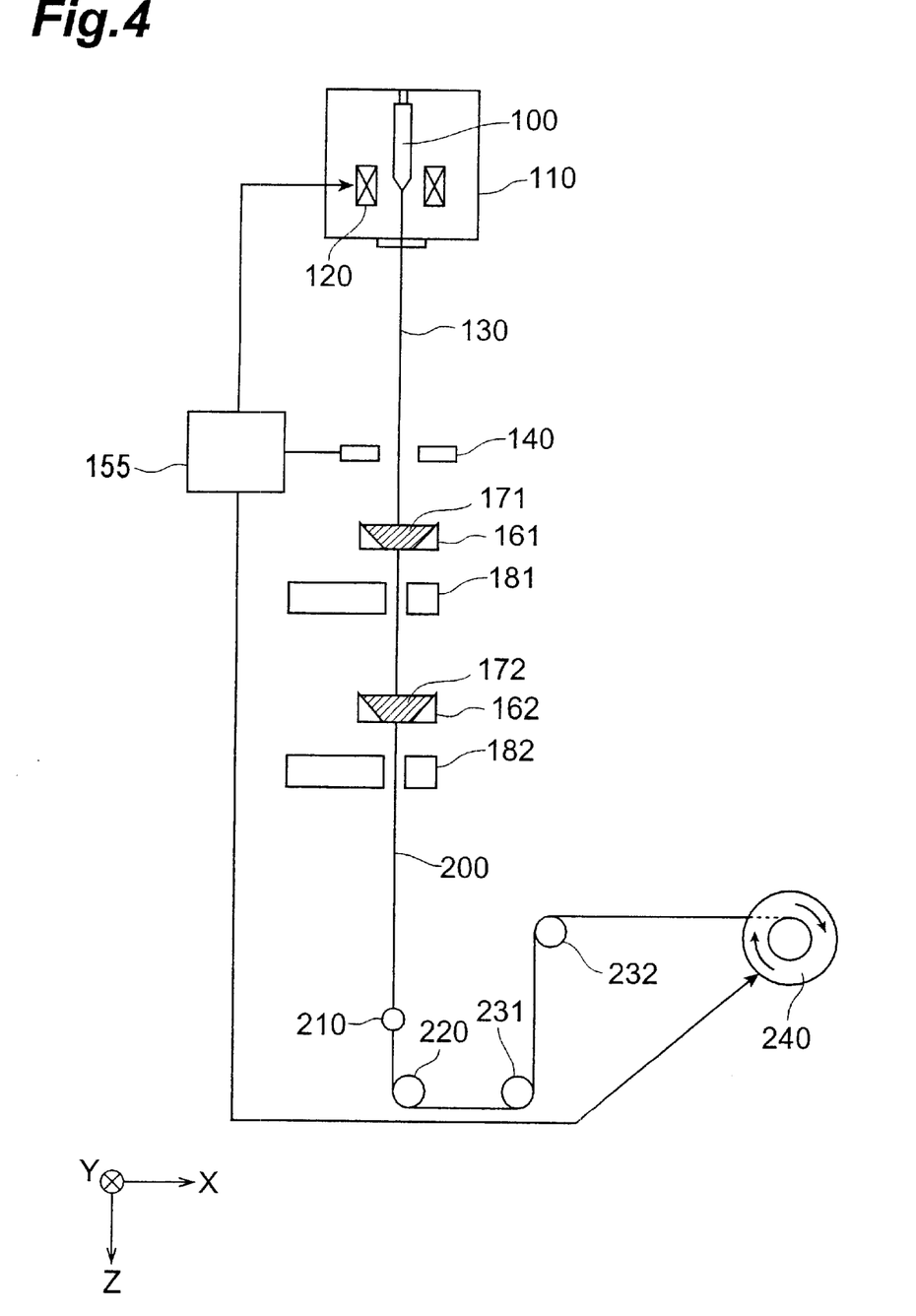
FIG. 4 is a view showing the structure of a manufacturing apparatus for realizing the method of making an optical fiber according to the present invention.
Figure 5A:
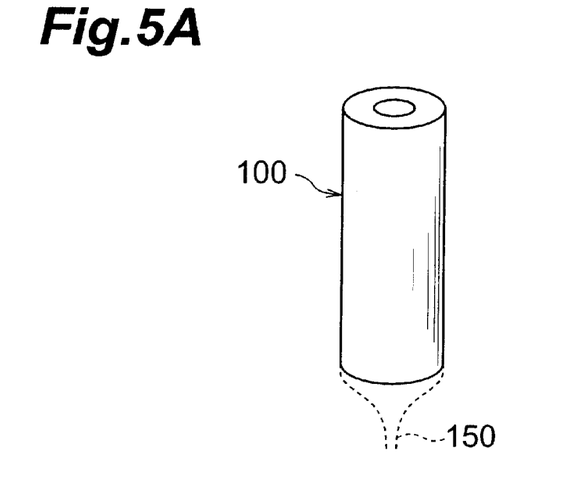
FIGS. 5A to 5C are views showing respective cross-sectional structures of a glass material at individual parts of the manufacturing apparatus shown in FIG. 4.
Figure 5B:
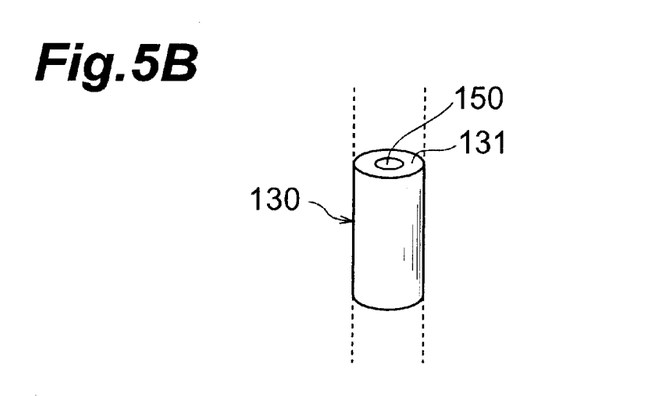
Figure 5C:
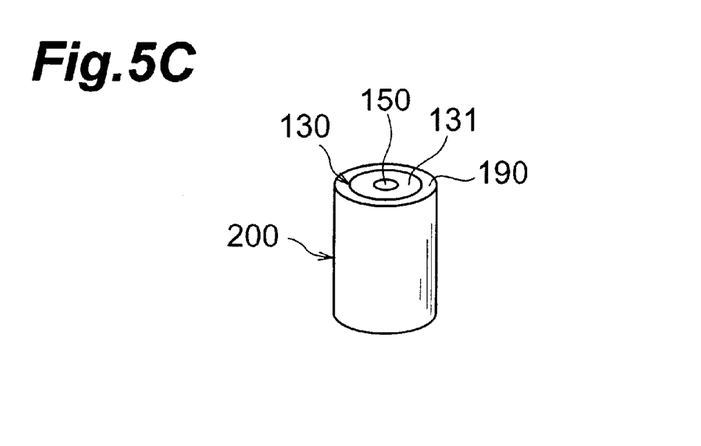

A method of making the optical fiber having the structure mentioned above will now be explained. FIG. 4 is a view showing the structure of an apparatus for making the optical fiber according to the present invention. As shown in FIG. 4, an optical fiber preform 100 is prepared at first in the making method according to the present invention. The optical fiber preform 100 is made by vapor-phase axial deposition method (VAD method), outside vapor deposition method (OVD method), modified chemical vapor deposition method (MCVD method), rod-in-tube method, or the like. The optical fiber preform 100 is mainly composed of silica glass, in which both dopant concentration and refractive index profile are uniform in the longitudinal direction (see FIG. 5A).

After the optical fiber perform 100 is set into a drawing furnace 110, the lower end of optical fiber preform 100 is heated by a heater 120 within the drawing furnace 110. The optical fiber preform 100 with a part thereof softened by the heating is drawn, whereby a bare optical fiber 130 is obtained (See FIG. 5B). The draining speed at this time is 100 m/mm, for example. The outer diameter of the bare optical fiber 130 obtained upon drawing is measured by a laser outer diameter meter 140. The result of measurement is reported to a drawing control unit 155, whereas the drawing control unit 155 controls the heating temperature of heating 120 and the drawing speed such that the outer diameter of bare optical fiber 130 attains a predetermined value according to the result of measurement.

Further, thus obtained bare optical fiber 130 travels through a liquid resin 171 stored in a first resin coating die 161, whereby a first layer of resin adheres to the surface of bare optical fiber 130. Subsequently, the bare optical fiber 130 having the first layer of resin attached thereto is irradiated with ultraviolet rays by a UV lamp 181, whereby the first layer of resin cures. Similarly, the bare optical fiber 130 covered with the first layer of resin travels through a liquid resin 172 stored in a second resin coating die 162. As a consequence, a second layer of resin adheres to the surface of first layer of resin. The second layer of resin is cured by ultraviolet rays irradiated by a UV lamp 182. By way of the foregoing process, an optical fiber 200 (see FIG. 5C) comprising a resin coating 190 composed of two layers of resin coated on the surface of bare optical fiber 130 is obtained. At this time, the coating diameter of optical fiber 200 is 250 $\mu$m, for example.

Subsequently, the optical fiber 200 passes between a pair of guide rollers 210 for suppressing the responsive motion of optical fiber, which freely rotate along the advancing direction of the optical fiber 200. Thereafter, the optical fiber 200 successively travels through a swing guide roller 220, a first stationary guide roller 231 installed subsequent to the swing guide roller 220, and a second stationary guide roller 232 installed subsequent to the first stationary guide roller 231, so as to be finally taken up by a drum 240.

The pair of guide rollers 210 for suppressing the responsive motion of optical fiber are installed at a position distanced directly upward from the swing guide roller 220 by 100 mm, whereas the gap between the pair of guide rollers 210 is 2 mm. The swing guide roller 220 has a roller outer diameter of 150 mm and a roller width of 30 mm, whereas the roller surface is made of aluminum which also forms the roller itself. The rotary axis of swing guide roller 220 swings about a direction parallel to a drawing tower axis (the Z-axis direction in which the optical fiber is drawn from the drawing furnace 110 to the swing guide roller 220 in the drawing) at 100 cycles/min from an angle of $-\theta$ to an angle of $+\theta$, for example. The first stationary guide roller 231 is installed at a position distanced directly sidewise from the swing guide roller 220 (in the X-axis direction of the drawing) by 250 mm, and has a roller outer diameter of 150 mm and a roller width of 30 mm as with the swing guide roller 220. However, the first stationary guide roller 231 has a fixed rotary axis, and a V-shaped narrow groove formed at the center part of roller surface as a structure for suppressing the rotation of optical fiber. The combination of the pair of guide rollers 210 for suppressing the responsive motion of optical fiber, the swing guide roller 220, and the first stationary guide roller 231, which are arranged under such a condition, provides the optical fiber 200 with a predetermined twist effectively, i.e., highly efficiently with respect to the swinging speed of swing guide roller 220.

A method of effectively providing the optical fiber 200 with a predetermined twist will now be explained with reference to FIGS. 6 and 7. Here, FIG. 6 is a view showing the swing guide roller 220 and the first stationary guide roller 231 in FIG. 4 as seen along the Z-axis direction, whereas FIG. 7 is a view similarly showing the pair of guide rollers 210 for suppressing the responsive motion of optical fiber and the swing guide roller 220 as seen along the Z-axis direction.

Figure 6:
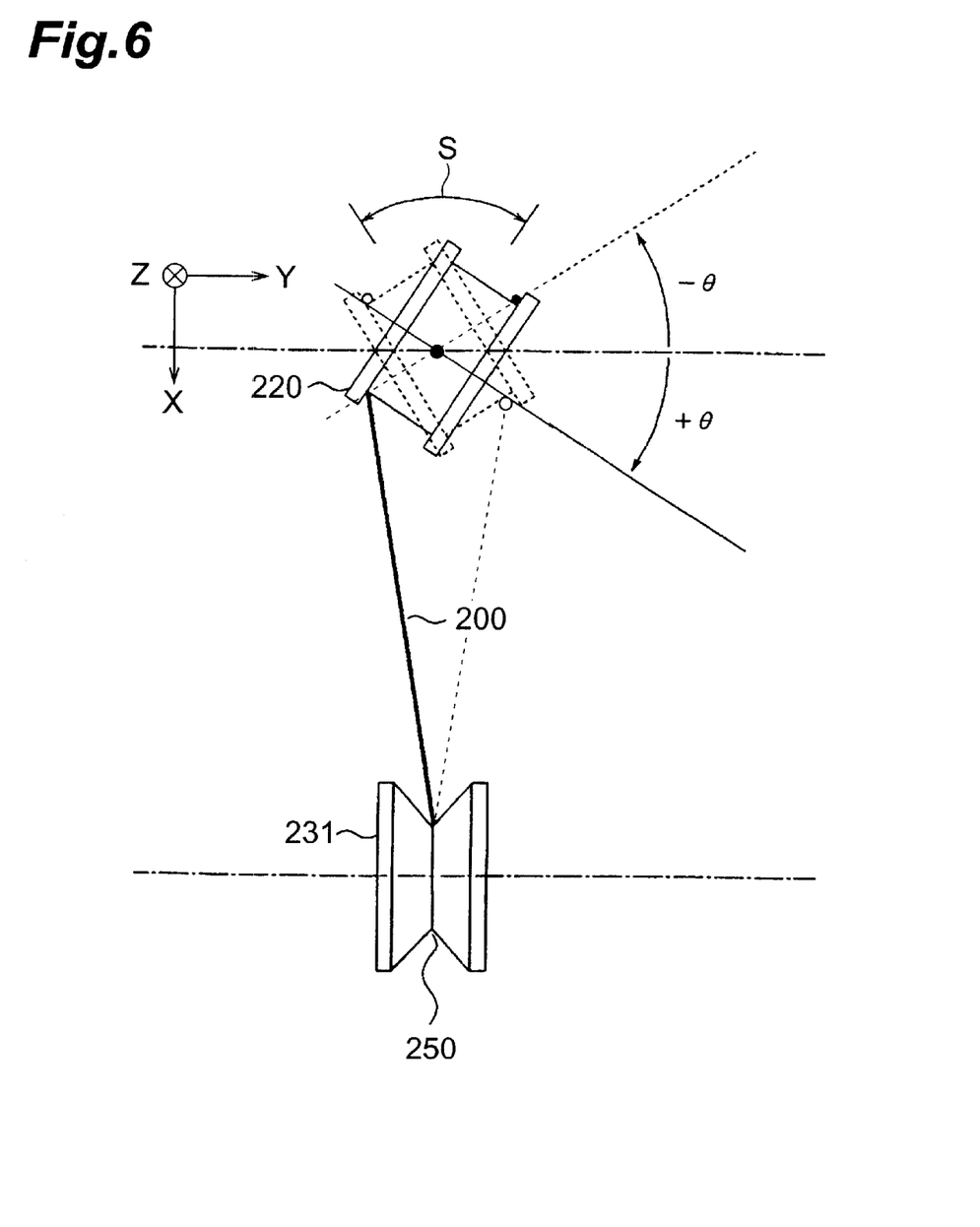
FIG. 6 is a view for explaining motions of a swing guide roller and a first stationary guide roller in the manufacturing apparatus shown in FIG. 4.
Figure 7:
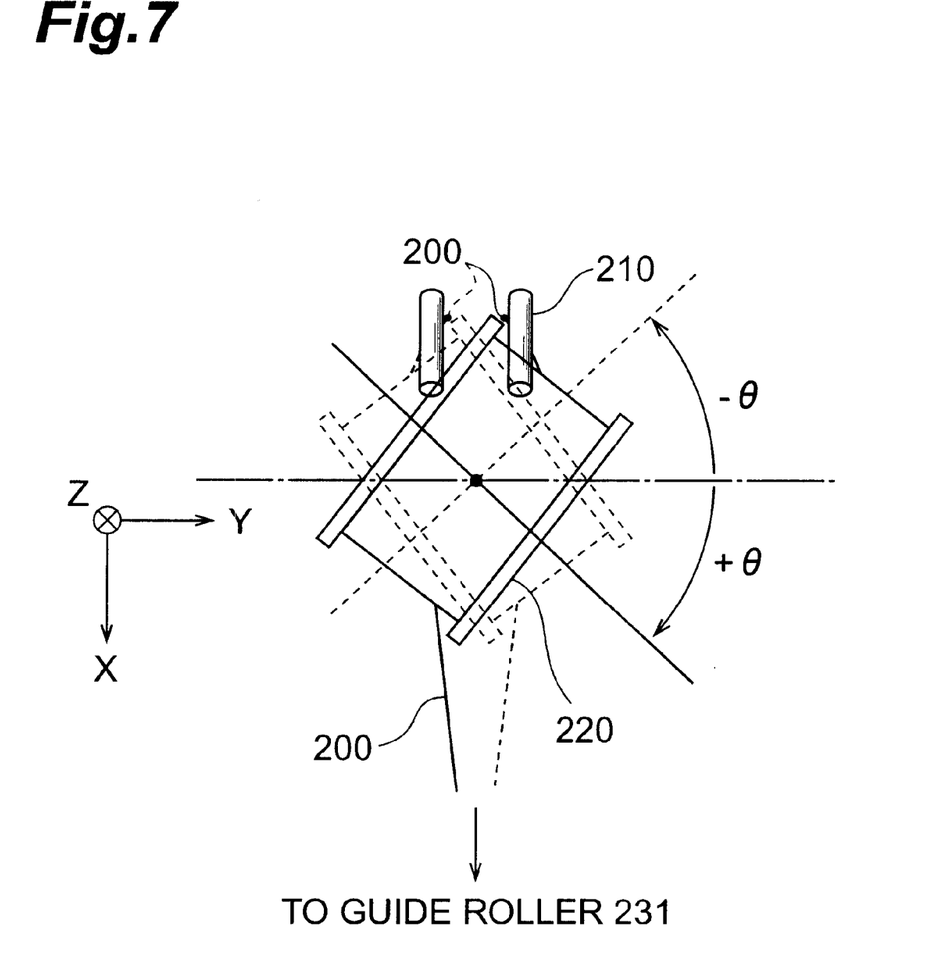
FIG. 7 is a view for explaining motions of the swing guide roller and a pair of guide rollers for suppressing the responsive motion of optical fiber in the manufacturing apparatus shown in FIG. 4.

If the swing guide roller 220 tilts by an angle of $+\theta$ about an axis parallel to the tower axis as shown in FIG. 6, then a force in a lateral direction (Y-axis direction) is exerted on the optical fiber 200 due to the tilting, whereby the optical fiber 200 rotates on the roller surface of swing guide roller 220. Due to this rotation, the optical fiber 200 is provided with a twist. Subsequently, the swing guide roller 220 conversely tilts by an angle of $-\theta$. As the swing guide roller 220 repeats symmetrical reciprocating motions between angles of $+\theta$ and $-\theta$ in the directions indicated by arrow S in the drawing, the optical fiber 200 is alternately provided with clockwise and counterclockwise twists with respect to the advancing direction.

Here, since the first stationary guide roller 231 is disposed at a position separated from the swing guide roller 220 in a directly sidewise direction (X-axis direction) and has a roller outer diameter identical to that of the swing roller 220, the length by which the optical fiber 200 comes into contact with the roller surface of swing guide roller 220 is substantially equal to the a roller periphery corresponding to ¼ of the circumference of swing guide roller 220. In practice, however, it exceeds an angle of 90° since the first stationary guide roller 231 is formed with a V-shaped groove. Namely, the optical fiber 200 comes into contact with the swing guide roller 220 from one of its half sides to the bottom portion thereof, and is released therefrom at the lowest part thereof. As a consequence, the optical fiber 200 rotates on the other half side of roller, so as to inhibit the optical fiber 200 from rotating on one half side, whereby the optical fiber 200 is prevented from sliding. As the optical fiber 200 thus rotates on one half side, the optical fiber 200 is provided with a twist highly efficiently with respect to the swinging speed of the swing guide roller 220.

The center part of roller surface of first stationary guide roller 231 is formed with a V-shaped narrow groove 250 as a structure for suppressing the rotation of optical fiber 200. The optical fiber 200 guided by the first stationary guide roller 231 is inserted into the V-shaped narrow groove 250. Consequently, the twist once provided by the swing guide roller 220 is kept from being released. Since the V-shaped narrow groove 250 thus prevents the optical fiber 200 from rotating on the roller surface of first stationary guide roller 231, the optical fiber 200 is provided with a twist highly efficiently with respect to the swinging speed of the swing guide roller 220.

If the swing guide roller 220 tilts by an angle of $+\theta$ about an axis parallel to the tower axis as shown in FIG. 7, so that the optical fiber 200 rotates on the roller surface of swing guide roller 220, then the optical fiber 200 on the drawing furnace side immediately in front of the swing guide roller 220 responsively moves in the swinging direction of swing guide roller 220 as the optical fiber 200 rotates. If this responsive motion of optical fiber 200 exceeds a predetermined range, then it causes the rate of twist provided to the optical fiber 200 to become too small, or the optical fiber 200 coated on the resin coating 190 to become uneven. Since a pair of guide rollers 210 are installed directly above the swing guide roller 220 (in the Z-axis direction), the optical fiber 200 will come into contact with one of the pair of guide rollers 210 if its responsive motion is at a predetermined level or more, whereby further responsive motion of optical fiber 200 will be inhibited. Since the pair of guide rollers 210 suppress the responsive motion of optical fiber 200 as such, the decrease in the rate of the twist provided to the optical fiber 200 and the unevenness in the optical fiber 200 coated with the resin coating 190 are suppressed.

Since the pair of guide rollers 210 for suppressing the responsive motion of optical fiber, the swing guide roller 220, and the first stationary guide roller 231 are combined as in the foregoing, the swing guide roller 220 alternately rotates the optical fiber 200 on its roller surface upon its swinging motion, so as to alternately provide the optical fiber 200 with clockwise and counterclockwise twists. At the same time, the pair of guide rollers 210 for suppressing the responsive motion of optical fiber and the first stationary guide roller 231 comprising the structure for suppressing the rotation of optical fiber assist the optical fiber 200 to rotate smoothly on the roller surface of swing guide roller 220, whereby the optical fiber 200 is provided with a twist highly efficiently with respect to the swinging speed of swing guide roller 220.

The optical fiber 200 is made by the above-mentioned making method, and comprises a core portion and a cladding portion covering the outer periphery of the core portion. Since the optical fiber 200 is alternately provided with clockwise and counterclockwise twists, polarization mode dispersion is suppressed in a long optical fiber as a whole even when the core and cladding portions do not have a concentric cross-sectional form of true circles in a manner equivalent to that in the case where they have a concentric form of true circles.

Also, since the optical fiber 200 coated with the resin coating 190 is kept from becoming uneven, the stress distribution in the cross section of optical fiber 200 is prevented from becoming asymmetrical, whereby strength can be improved when the optical fiber 200 is formed into a cable.

Though the swinging motion of swing guide roller 220 mentioned above is a symmetrical reciprocating motion between angles of $-\theta$ and $+\theta$ as shown in FIG. 6, it is not restricted thereby and may be an asymmetrical reciprocating motion between angles of 0 and $+\theta$, for example. In this case, the optical fiber 200 is intermittently provided with a twist. Also, the swinging motion of swing guide roller 220 may be a symmetrical reciprocating motion swinging along the rotary axis of swing guide roller 220. In this case, the optical fiber 200 is alternately provided with clockwise and counterclockwise twists. Though the first stationary guide roller 231 is provided with the V-shaped narrow groove 250 as a structure for suppressing the rotation of optical fiber, similar effects can be exhibited when a U-shaped narrow groove or a recessed narrow groove is provided instead.

Further, in the making method according to the present invention, drawing conditions are changed such that positive and negative dispersion portions respectively having positive and negative chromatic dispersions at a predetermined wavelength within a wavelength band in use alternately appear in the longitudinal direction of optical fiber 200. Namely, the drawing tension or the diameter of the resulting bare optical fiber 130 is changed along the longitudinal direction when drawing the optical fiber preform 100. The change in drawing tension or fiber diameter may be managed either by the drawn fiber length or by time. Also, the change in drawing tension or fiber diameter may be effected either by changing the temperature in the molten part of optical fiber preform 100 within the drawing furnace 110 upon drawing or by changing the drawing speed upon drawing. In each case, the chromatic dispersion of the optical fiber 200 at the predetermined wavelength can be changed along the longitudinal direction.

The optical fiber 200 obtained by the making method explained in the foregoing corresponds to the optical fiber 10 according to the present invention adjusted so as to change the twist along the longitudinal direction thereof and so as to change the polarity of chromatic dispersion along the longitudinal direction thereof. In the above-mentioned making method, the average rate of twist is preferably 2 rotations/m or more, whereas the deviation of twist rate is preferably 1 rotation/m or more. Preferably, the transient region positioned between the positive and negative dispersion portions of optical fiber 200 is not substantially provided with the twist.

Examples of the optical fiber according to the present invention will now be explained.

The optical fiber according to a first example is a dispersion-shifted optical fiber, drawn at a linear velocity of 100 m/min, having a zero-dispersion wavelength near a wavelength of 1.55 $\mu$m. This dispersion-shifted optical fiber has a dual core type refractive index profile ($\Delta n_1=1.0\%$, $\Delta n_2=0.15\%$, $2a/2b=0.24$), for example, as shown in FIG. 1 of Yoshiaki Terasawa et al., "Design Optimization of Dispersion Shifted Fiber with Enlarged Mode Field Diameter for WDM Transmission," IOOC-95, FA2-2, Tenth International Conference on Integrated Optics and Optical Fiber Communication, TECHNICAL DIGEST, Vol. 4, Jun. 30, 1995. Also, the optical fiber according to the first example is alternately provided with positive and negative dispersion portions by changing its fiber diameter (i.e., changing its core diameter) along the longitudinal direction, and is further provided with a twist. In the optical fiber according to the first example, the positive and negative dispersion portions have respective fiber diameters of 121 $\mu$m and 129 $\mu$m, a segment length of 5 km each, and a transient region positioned therebetween with a length of 10 m. While the optical fiber has an average twist rate of 3 rotations/m in the region where the fiber length is substantially constant in each of the positive and negative dispersion portions, the transient region where the fiber diameter changes is provided with no twist.

In the optical fiber according to the first example, at a wavelength of 1.55 $\mu$m, the chromatic dispersion of positive dispersion portion is about 3 ps/nm/km, the chromatic dispersion of negative dispersion portion is about $-3$ ps/nm/km, and the average chromatic dispersion over a length of 50 km is 0.1 ps/nm/km. The polarization mode dispersion of this optical fiber is 0.07 ps·km$^{-\frac{1}{2}}$ at a wavelength of 1.55 $\mu$m. Thus, the optical fiber according to the first example has an average chromatic dispersion and a polarization mode dispersion which are sufficiently low.

Figure 8:
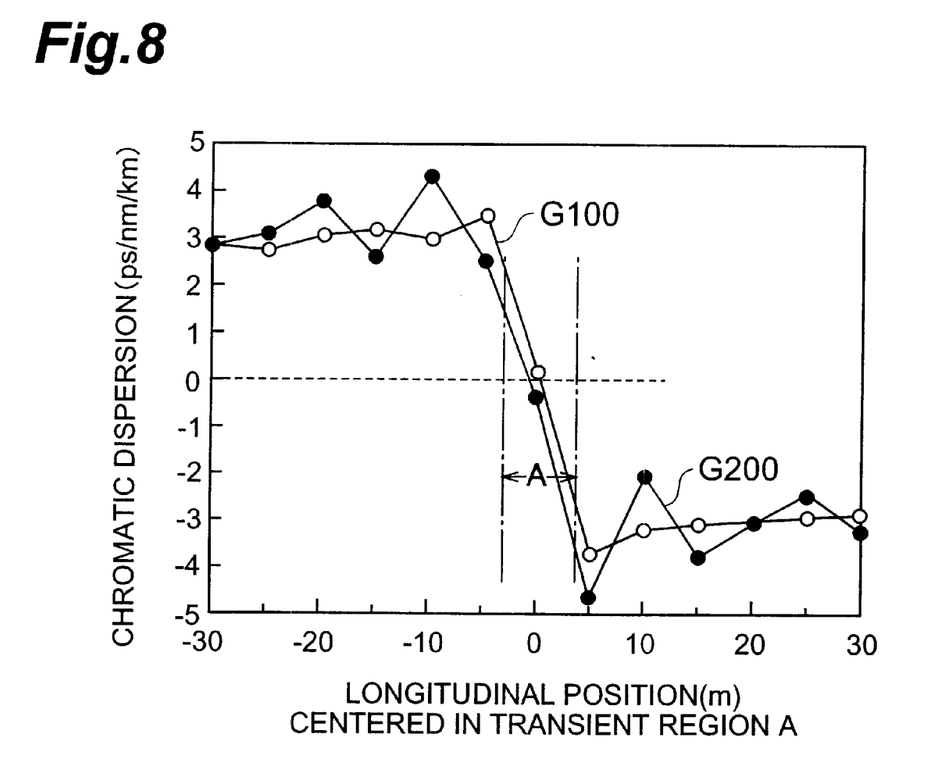
FIG. 8 is a graph showing a chromatic dispersion distribution in the vicinity of a transient region in a first example of the optical fiber according to the present invention.

FIG. 8 is a graph showing the chromatic dispersion distribution of the optical fiber according to the first example in the longitudinal direction (near the transient region in particular). Here, curves G100 and G200 indicate the respective chromatic dispersions of the optical fibers according to the first example and a comparative example. Assuming the position where the chromatic dispersion becomes substantially 0 ps/nm/km to be zero point in the abscissa, FIG. 8 shows the chromatic dispersion in the region centered at this position. In the optical fiber prepared as the comparative example, the transient region A is also provided with a twist having an average rate of 3 rotations/m.

As can be seen from FIG. 8, the longitudinal change of chromatic dispersion is more stable in the optical fiber according to the first example in which the transient region A is provided with no twist as compared with the optical fiber according to the comparative example in which the transient region A is also provided with a twist.

Figure 9A:
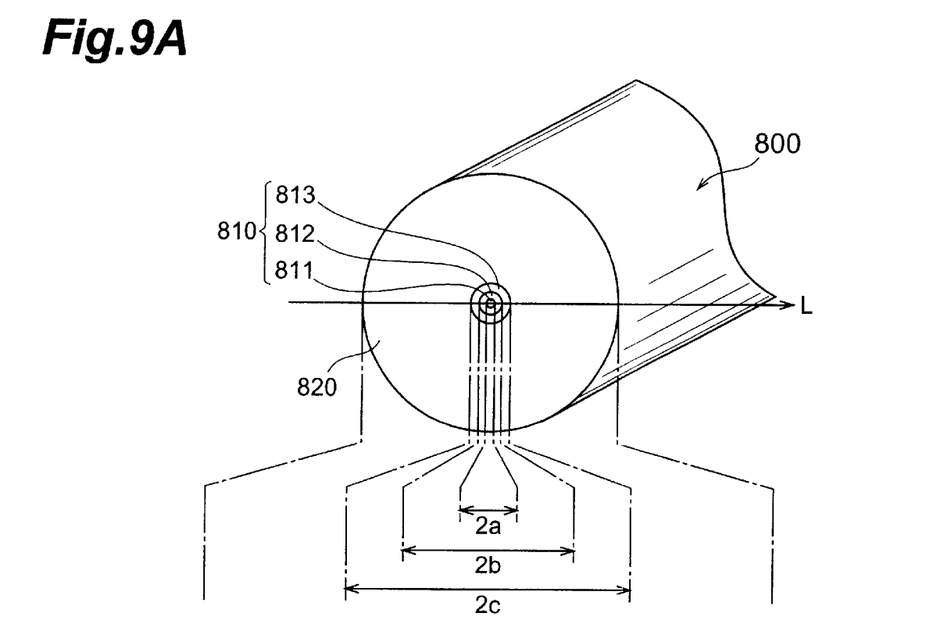
FIGS. 9A and 9B are a view for showing the cross-sectional structure of a second example of the optical fiber according to the present invention and a refractive index profile thereof, respectively.
Figure 9B:
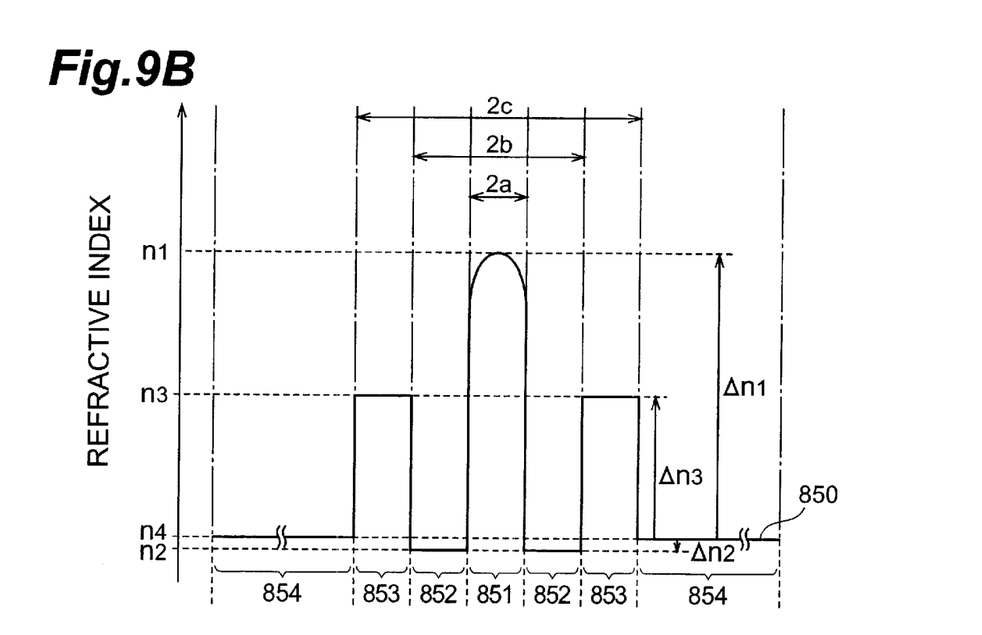

The optical fiber manufactured as a second example has the structure shown in FIGS. 9A and 9B. Namely, FIG. 9A is a view showing the cross-sectional structure of the optical fiber according to the second embodiment, whereas FIG. 9B is a refractive index profile of the optical fiber according to the second example.

As shown in FIG. 9A, the optical fiber 800 according to the first example comprises a core region 810 extending along a predetermined axis, and a cladding region 820 with a refractive index $n_4$ covering the outer periphery of the core region 810. The core region 810 comprises a first core 811 with a refractive index $n_1$ ($>n_4$) extending along the predetermined axis, a second core 812 with a refractive index $n_2$ ($<n_1$) provided on the outer periphery of the first core 811, and a third core 813 with a refractive index $n_3$ ($<n_1, n_2$) provided on the outer periphery of the second core 812. The first core 811 has an outer diameter $2a$ and a relative refractive index difference $\Delta n_1$ ($=(n_1-n_4)/n_4$) with reference to the cladding region 820. The second core 812 has an outer diameter $2b$ and a relative refractive index difference $\Delta n_2$ ($=(n_2-n_4)/n_4$) with reference to the cladding region 820. The third core 813 has an outer diameter $2c$ and a relative refractive index difference $\Delta n_3$ ($=(n_3-n_4)/n_4$) with reference to the cladding region 820.

Specifically, the outer diameter $2a$ of the first core 811 is 8.1 µm, whereas the first core 811 is doped with $GeO_2$ to such an extent that the relative refractive index difference $\Delta n_1$ with respect to the cladding region 820 becomes 0.63%. The outer diameter $2b$ of the second core 812 surrounding the first core 811 is 15.8 µm, whereas the second core 812 is doped with F element to such an extent that the relative refractive index difference $\Delta n_2$ with respect to the cladding region 820 becomes −0.25%. The outer diameter $2c$ of the third core 813 surrounding the second core 812 is 22.6 µm, whereas the third core 813 is substantially made of pure silica glass with its relative refractive index difference $\Delta n_3$ with respect to the cladding region 820 changing within the range from 0.13% to 0.22% depending on the drawing tension. The outer diameter of the cladding region 820 surrounding the third core 813 is 125 µm, whereas the cladding region 820 is doped with F element.

The refractive index profile 850 shown in FIG. 9B indicates the relative refractive index difference of each part on the line L in FIG. 9A, so that areas 851, 852, 853, and 854 represent refractive indices of the first core 811, second core 812, third core 813, and cladding region 820 on the line L, respectively. In this specification, the respective relative refractive index differences of the glass layers 811 to 813 with respect to the cladding region 820 acting as a reference region are expressed in terms of percentage, whereas the refractive indices in each expression are in a fixed order. Therefore, the refractive index of a glass layer whose relative refractive index difference exhibits a negative value is meant to be lower than that of the cladding region 820.

The optical fiber according to the second example comprising the foregoing structure is alternately provided with positive and negative dispersion portions by changing the drawing tension in the longitudinal direction upon drawing, and is further provided with a twist. In the second example, the drawing tension at the time of drawing for yielding the positive dispersion portion was 882 mN (90 g), whereas the drawing tension at the time of drawing for yielding the negative dispersion portion was 392 mN (40 g). Also, each of the positive and negative dispersion portions has a length of 5 km, whereas the transient region positioned between the positive and negative dispersion portions has a length of 50 m. Since the third core 813 is substantially made of pure silica glass in the optical fiber according to the second example, the drawing tension concentrates on the third core 813, the stress corresponding to the drawing tension remains within the third core 813, and the refractive index of third core 813 decreases according to the residual stress. Namely, the chromatic dispersion characteristic in each part of the optical fiber changes according to the fluctuation in drawing tension. As a result, at a wavelength of 1.55 µm, the positive dispersion portion drawn at a drawing tension of 882 mN in the optical fiber according to the second example has a chromatic dispersion of 4.2 to 4.6 ps/nm/km and a dispersion slope of 0.006 to 0.009 ps/nm²/km. On the other hand, the negative dispersion portion drawn at a drawing tension of 392 mN in the optical fiber according to the second example has a chromatic dispersion of −3.5 to −2.3 ps/nm/km and a dispersion slope of −0.045 to −0.042 ps/nm²/km.

The positive and negative dispersion portions, i.e., the regions where the drawing tension is substantially constant, are provided with a twist in the second example as well. When the drawing tension at the time of manufacture rises in the second example, the pressing force of the optical fiber 200 (corresponding to the optical fiber according to the second example) with respect to the swing guide roller 220 increases, so that the idling of optical fiber 200 is reduced, whereby the twist applied to the optical fiber 200 enhances its pitch even when the operating condition for the swing guide roller 220 is constant (see FIGS. 4, 6, and 7). Since the operating condition of swing guide roller 220 is made constant in each of the positive and negative dispersion portions, the average rate of twist is 3 rotations/m in the positive dispersion portion drawn at a drawing tension of 392 mN, whereas it is 5 rotations/m in the negative dispersion portion drawn at a drawing tension of 882 mN. The operation of swing guide roller 220 is stopped in the transient region obtained when the drawing tension changes, whereby this region is provided with no twist.

At a wavelength of 1.55 µm, the optical fiber according to the second example has an average chromatic dispersion of 0.8 ps/nm/km over a length of 50 km, and an average dispersion slope of −0.015 ps/nm²/km over a length of 50 km. Also, the optical fiber according to the second example has a polarization mode dispersion of 0.04 ps·km$^{-1/2}$ at a wavelength of 1.55 µm. Thus, the optical fiber according to the second example has an average chromatic dispersion, an average dispersion slope, and a polarization mode dispersion which are sufficiently low. Also, it has been verified that the average coupling length is sufficiently small, i.e., 5 m.

Figure 10:
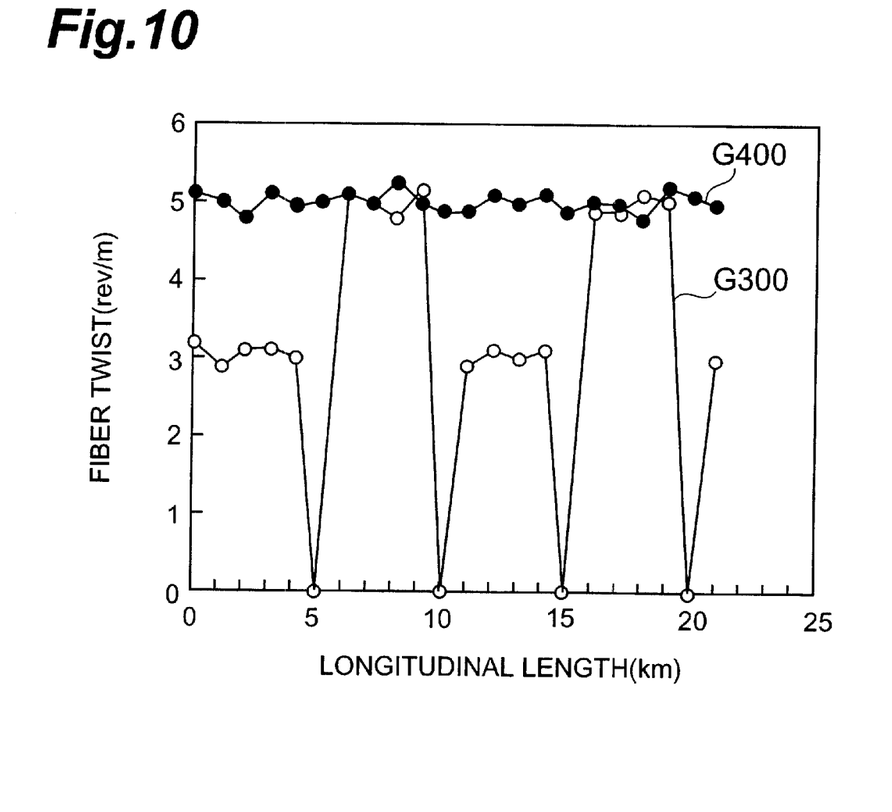
FIG. 10 is a graph showing a twist rate distribution along the longitudinal direction of the optical fiber according to the second example shown in FIGS. 9A and 9B.

FIG. 10 is a graph showing the distribution of twist rate along the longitudinal direction of the optical fiber according to the second example. Here, curves G300 and G400 represent the respective twist rates provided to the optical fiber according to the second example and the optical fiber prepared as a comparative example. The optical fiber according to the comparative example was made by using an optical fiber preform having a structure similar to that of the optical fiber preform used when making the optical fiber according to the second example, and drawing it with a constant drawing tension of 882 mN (90 g). The optical fiber according to this comparative example has a substantially constant twist rate along the longitudinal direction with an average value of 5 rotations/m. At a wavelength of 1.55 µm, the optical fiber according to the comparative example has a chromatic dispersion of 4.4 ps/nm/km, a dispersion slope of 0.007 ps/nm²/km, and a polarization mode dispersion of 0.08 ps·km$^{-1/2}$. The average coupling length is 20 m.

Since the twist rate changes along the longitudinal direction in the optical fiber according to the second example, the coupling between polarization modes of propagating light is induced more randomly, the polarization mode dispersion becomes lower, and the average coupling length becomes shorter as compared with the optical fiber of the comparative example in which the twist rate is substantially uniform along the longitudinal direction.

Figure 11:
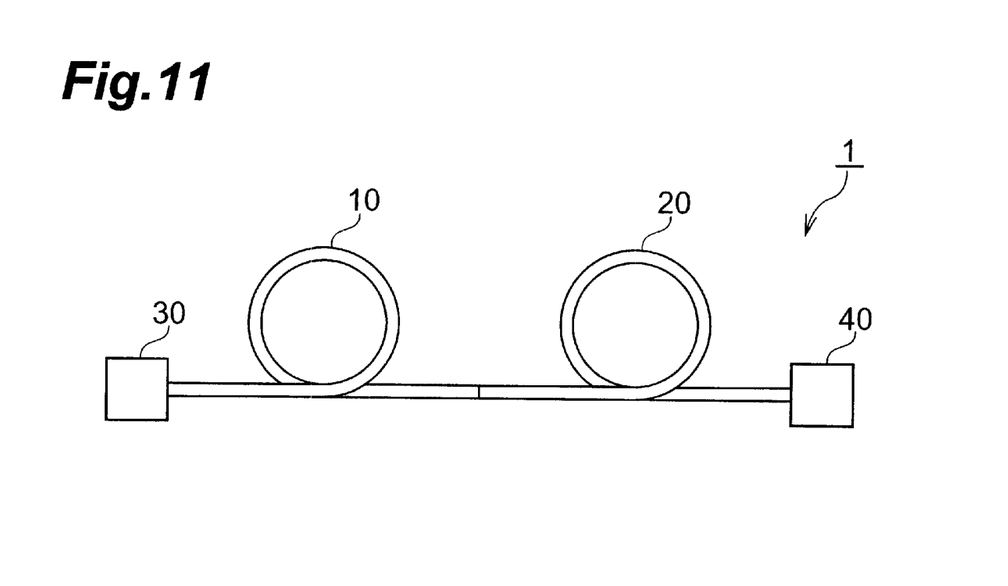
FIG. 11 is a view showing the schematic configuration of the optical transmission system according to the present invention.

An optical transmission system according to the present invention will now be explained. FIG. 11 is a view showing the schematic configuration of the optical transmission system 1 according to the present invention. In this optical transmission system 1, the optical fiber 10 according to the present invention comprising the characteristic structure mentioned above and another optical fiber 20 are fusion-spliced together as an optical transmission line. This optical transmission line connects a transmitting station (or repeater station) 30 and a receiving station (or repeater station) 40 to each other. The space between the stations 30, 40 constitutes a single repeated section.

In the optical transmission system 1, the optical fiber 10 according to the present invention may be employed either in the whole repeated section between the stations 30, 40 or in a part of the repeated section as shown in FIG. 11. In the latter case, the optical fiber is preferably laid on the upstream side of the repeated section. This configuration effectively restrains transmission characteristics from deteriorating on the upstream side of the repeated section in which the signal power is relatively high so that nonlinear optical phenomena are likely to occur. Also, since a standard single-mode optical fiber is employed as the optical fiber 20 positioned on the downstream side of the repeated section, the optical transmission system 1 can be constructed inexpensively. When the optical fiber 10 according to the present invention has a longitudinally uniform fiber diameter or the change in fiber diameter of the optical fiber 10 is small in the longitudinal direction, its coupling with another optical fiber 20 becomes easier, whereby the coupling loss can be kept lower.

Since the optical fiber 10 having a locally large absolute value of chromatic dispersion at a predetermined wavelength within a wavelength band in use with a small absolute value of average chromatic dispersion and a low polarization mode dispersion is employed as at least a part of the optical transmission line, the optical transmission system 1 lowers the waveform deterioration caused by any of the nonlinear optical phenomena, cumulative chromatic dispersion, and polarization mode dispersion, exhibits an excellent transmission quality, and enables higher-speed, larger-capacity WDM transmission.

In the present invention, as in the foregoing, positive and negative dispersion portions are alternately provided along the longitudinal direction so as to effect dispersion management, whereby the waveform deterioration caused by any of nonlinear optical phenomena and cumulative chromatic dispersion is lowered. Since it further comprises a polarization coupling structure for inducing coupling between polarization modes of propagating light, the waveform deterioration caused by polarization mode dispersion is also lowered. Therefore, the optical fiber according to the present invention is excellent in transmission quality, and thus is suitable for an optical transmission line enabling higher-speed, larger-capacity WDM transmission.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. An optical fiber in which at least one first portion having a positive chromatic dispersion at a predetermined wavelength within a wavelength band in use and at least one second portion having a negative chromatic dispersion at said predetermined wavelength are alternately arranged along a longitudinal direction thereof;
said optical fiber further comprising a polarization coupling structure for inducing coupling between polarization modes of propagating light.

2. An optical fiber according to claim 1, wherein said optical fiber has a polarization mode dispersion of 0.1 ps·km$^{-1/2}$ or less at said predetermined wavelength.

3. An optical fiber according to claim 1, wherein said optical fiber has an average coupling length of 10 m or less, said average coupling length being defined by the length from an end part of said optical fiber to a boundary at which a region where the polarization mode dispersion value is in proportion to the fiber length shifts to a region where the polarization mode dispersion value is in proportion to the square root of fiber length.

4. An optical fiber according to claim 1, wherein said polarization coupling structure includes a twist applied to said optical fiber.

5. An optical fiber according to claim 4, wherein said twist has an average twist rate of 2 rotations/m or more.

6. An optical fiber according to claim 4, wherein said twist has a twist rate deviation of 1 rotation/m or more.

7. An optical fiber according to claim 4, wherein a transient region positioned between each said first portion and each said second portion is substantially kept from being provided with said twist.

8. A method of making an optical fiber, said method comprising the steps of preparing an optical fiber preform and drawing a part of thus prepared optical fiber preform while heating a part thereof;
wherein a drawing condition is changed at the time of drawing such that at least one first portion having a positive chromatic dispersion at a predetermined wavelength within a wavelength band in use and at least one second portion having a negative dispersion at said predetermined wavelength are alternately formed along a longitudinal direction, and a predetermined part of said optical fiber obtained by said drawing is provided with a twist.

9. A method of making an optical fiber according to claim 8, wherein said twist provided to said optical fiber obtained by said drawing has an average twist rate of 2 rotations/m or more.

10. A method of making an optical fiber according to claim 8, wherein said twist provided to said optical fiber obtained by said drawing has a twist rate deviation of 1 rotation/m or more.

11. A method of making an optical fiber according to claim 8, wherein a transient region positioned between each said first portion and each said second portion is substantially kept from being provided with said twist.

12. A optical transmission system including the optical fiber of claim 1 as at least a part of an optical transmission line in a repeated section.

13. An optical fiber according to claim 1, wherein said optical fiber ensures a single mode at the predetermined wavelength at the wavelength band in use and comprises a plurality of glass layers sequentially provided in a radial direction,
wherein a dopant concentration of a glass layer doped with a dopant for adjustment of refractive index, out of said plurality of glass layers, is made substantially uniform along a longitudinal direction of said optical fiber, and
wherein, a refractive index of a glass layer not substantially contained with $GeO_2$ as the dopant, out of said plurality of glass layers, is changed along the longitudinal direction of said optical fiber.

14. An optical fiber according to claim 1, wherein a residual stress in said first portion with the positive chromatic dispersion is different from that in said second portion with the negative chromatic dispersion.

15. An optical fiber according to claim 1, wherein said glass layer not substantially contained with $GeO_2$ as the dopant, out of said plurality of glass layers, includes a layer of pure silica glass.

16. An optical fiber according to claim 13, wherein said first portion has the chromatic dispersion of +3 ps/nm/km or more +4.6 ps/nm/km or less at the predetermined wavelength within the wavelength band in use, and
   wherein said second portion has the chromatic dispersion of −3 ps/nm/km or more but −2.3 ps/nm/km or less at the predetermined wavelength within the wavelength band in use.

17. An optical fiber according to claim 13, wherein said first portion has a length of 5 km or less, and
   wherein said second portion has a length of 5 km or less.

18. An optical fiber according to claim 13, wherein a cumulative length of transient portions, which are positioned between said first portion and said second portion adjacent to each other and which have a chromatic dispersion from 80% of a minimum absolute value of the negative chromatic dispersion to 80% of a maximum absolute value of the positive chromatic dispersion at the predetermined wavelength within the wavelength band in use, is set to 0.1% to 0.5% of a total length of said optical fiber.

19. An optical fiber according to claim 13, wherein, at the predetermined wavelength within the wavelength band in use, an absolute value of a mean chromatic dispersion from a viewpoint of said whole optical fiber is set to 0.8 ps/nm/km or less.

20. An optical fiber according to claim 13, wherein said optical fiber comprises a core region including a layer of pure silica glass and extending along a predetermined axis, and a cladding region provided around an outer periphery of said core region.

21. An optical fiber according to claim 20, wherein said core region comprises a first core doped with $GeO_2$ and having a relative refractive index difference of 0.63% or more with respect to a reference region in said cladding region, a second core provided so as to surround said first core and doped with F element, said second core having a refractive index lower than that of pure silica glass, and a third core of pure silica glass provided so as to surround said second core, and
   wherein said cladding region includes a glass layer provided so as to surround said third core and doped with F element, said glass layer having a refractive index lower than that of pure silica glass.

22. An optical fiber according to claim 21, wherein said second core has the refractive index lower than that of the reference region in said cladding region.

23. An optical fiber preform for manufacturing an optical fiber according to claim 13, wherein out of regions respectively corresponding to said plurality of glass layers, a dopant concentration of a region containing a dopant for adjustment of refractive index is made substantially uniform along a longitudinal direction of said optical fiber preform.

24. A method of manufacturing an optical fiber ensuring a single mode at a predetermined wavelength within a wavelength band in use, in which at least one first portion having a positive chromatic dispersion at the predetermined wavelength within the wavelength band in use and at least one second portion having a negative chromatic dispersion at the predetermined wavelength within the wavelength band in use are arranged alternately and adjacent to each other, said optical fiber comprising a plurality of glass layers sequentially provided in a radial direction
   wherein a dopant concentration of a glass layer doped with a dopant for adjustment of refractive index, out of said plurality of glass layers, is made substantially uniform along a longitudinal direction of said optical fiber, and
   wherein, a refractive index of a glass layer not substantially contained with $GeO_2$ as the dopant, out of said plurality of glass layers, is changed along the longitudinal direction of said optical fiber, said method comprising the steps of:
      preparing an optical fiber preform according to claim 23; and
      drawing said prepared optical fiber preform while changing a drawing tension every a predetermined time interval.

25. An optical fiber preform for manufacturing an optical fiber according to claim 13, wherein, out of regions respectively corresponding to said plurality of glass layers, a relative refractive index difference of each region containing a dopant for adjustment of refractive index with respect to pure silica glass is made substantially uniform along a longitudinal direction of said optical fiber preform.

26. A method of manufacturing an optical fiber ensuring a single mode at a predetermined wavelength within a wavelength band in use, in which at least one first portion having a positive chromatic dispersion at the predetermined wavelength within the wavelength band in use and at least one second portion having a negative chromatic dispersion at the predetermined wavelength within the wavelength band in use are arranged alternately and adjacent to each other, said optical fiber comprising a plurality of glass layers sequentially provided in a radial direction,
   wherein a dopant concentration of a glass layer doped with a dopant for adjustment of refractive index, out of said plurality of glass layers, is made substantially uniform along a longitudinal director of said optical fiber, and
   wherein, a refractive index of a glass layer not substantially contained with $GeO_2$ as the dopant, out of said plurality of glass layers, is changed along the longitudinal direction of said optical fiber, said method comprising the steps of:
      preparing an optical fiber preform according to claim 25; and
      drawing said prepared optical fiber preform while changing a drawing tension every a predetermined time interval.

27. An optical fiber according to claim 1, wherein said first portion has, at the predetermined wavelength within the wavelength band in use, a chromatic dispersion with an absolute value of 1 ps/nm/km or more, and a dispersion slope with a predetermined sign; and
   wherein said second portion has, at the predetermined wavelength within the wavelength band in use, a chromatic dispersion, in a sign opposite to that of the chromatic dispersion of said first portion, with an absolute value of 1 ps/nm/km or more and a dispersion slope in a sign opposite to that of the dispersion slope of the first portion.

28. An optical fiber according to claim 1, wherein said optical fiber is a unitary optical fiber, said unitary optical fiber being provided with first parts each corresponding to said first portion and second portion, said first and second parts being arranged adjacent each other along a longitudinal direction of said unitary optical fiber.

29. An optical fiber according to claim 28, wherein each of said first parts has a positive chromatic dispersion and a positive dispersion slope at the predetermined wavelength within the wavelength band in use, and wherein each of said second parts has a negative chromatic dispersion and a negative dispersion slope at the predetermined wavelength within the wavelength band in use.

* * * * *